UNITED STATES PATENT OFFICE.

RETIRE C. STURGES, OF BOSTON, MASSACHUSETTS.

IMPROVEMENT IN PROCESSES OF RENDERING SAIL-DUCK, AWNING-CANVAS, &c., PROOF AGAINST MILDEW.

Specification forming part of Letters Patent No. 128,079, dated June 18, 1872.

*To all whom it may concern:*

Be it known that I, RETIRE C. STURGES, of Boston, in the county of Suffolk and State of Massachusetts, have invented a new Process of Rendering Sail-Duck, Awning-Canvas, &c., Proof against Mildew when exposed to the action of moisture and heat; and I do hereby declare that the following is a full and clear description thereof.

Place in a suitable vessel fifty pounds, or thereabout, of common salt, four pounds of lime, and one pound of alum. Incorporate said ingredients with a sufficient quantity of water to produce a strong solution. Then, after placing the duck, canvas, or other article to be treated in said solution, raise it to a boiling temperature, and retain it at or about that temperature for about the space of three hours, at the end of which time it will be found that the starch has been removed from the thus-treated duck or other article, and the fibers thereof will be saturated with the solution of salt, lime, and alum, which will not impair the strength of the fabric, while it will render it more pliable and much more easily worked and handled.

I do not intend to restrict myself to any precise proportions of the salt, lime, and alum, and water employed in my process of rendering duck, canvas, &c., proof against the generation of mildew; nor do I intend to restrict myself to any precise length of time of exposing the duck, canvas, &c., to the action of the solution formed of said ingredients, while I render said fabrics proof against mildew by means substantially the same as herein set forth.

I claim as my invention—

The within-described process of rendering duck, canvas, &c., proof against mildew when exposed to the action of moisture and heat.

In testimony that the aforegoing is a full and clear specification of my new and improved process of preventing canvas-sails, awnings, &c., from mildewing, I hereunto subscribe my name this 6th day of May, 1872.

RETIRE C. STURGES.

Witnesses:
K. W. BAKER,
EDWIN P. HUTCHINSON.